(12) United States Patent
Lei et al.

(10) Patent No.: US 10,929,404 B2
(45) Date of Patent: Feb. 23, 2021

(54) STREAMING JOINS WITH SYNCHRONIZATION VIA STREAM TIME ESTIMATIONS

(71) Applicant: Facebook, Inc., Menlo Park, CA (US)

(72) Inventors: Ran Lei, San Jose, CA (US); Gabriela Jacques da Silva, Somerville, MA (US)

(73) Assignee: Facebook, Inc., Menlo Park, CA (US)

( * ) Notice: Subject to any disclaimer, the term of this patent is extended or adjusted under 35 U.S.C. 154(b) by 228 days.

(21) Appl. No.: 16/047,796

(22) Filed: Jul. 27, 2018

(65) Prior Publication Data

US 2020/0034468 A1   Jan. 30, 2020

(51) Int. Cl.
  *G06F 16/2455*  (2019.01)
  *G06F 17/18*    (2006.01)
  *G06F 16/27*    (2019.01)

(52) U.S. Cl.
  CPC .... *G06F 16/24568* (2019.01); *G06F 16/2456* (2019.01); *G06F 16/27* (2019.01); *G06F 17/18* (2013.01)

(58) Field of Classification Search
  CPC ...... G06F 16/24568; G06F 1/12; G06F 9/542; G06F 16/2456
  USPC .................................................. 707/736, 610
  See application file for complete search history.

(56) References Cited

U.S. PATENT DOCUMENTS

2008/0301135 A1* 12/2008 Alves ................. G06F 16/2453
2018/0184138 A1*  6/2018 Shaw ................. H04N 21/4828

OTHER PUBLICATIONS

Abraham et al., Diving into Data at Facebook. Proc. VLDB Endow., 6(11):1057-1067, Aug. 2013.
Akidau et al., MillWheel: Fault-Tolerant Stream Processing at Internet Scale, Proc. VLDB Endow., 6(11):1033-1044, Aug. 2013.
Akidau et al., The Dataflow Model: A Practical Approach to Balancing Correctness, Latency, and Cost in Massive-Scale, Unbounded, Out-of-Order Data Processing. Proc. VLDB Endow., 8(12):1792-1803, Aug. 2015.
Ananthanarayanan et al., Photon: Fault-Tolerant and Scalable Joining of Continuous Data Streams. In SIGMOD, 2013.
Apache Calcite, https://calcite.apache.org/, Jun. 23, 2018, retrieved from: https://web.archive.org/web/20180623095148/https://calcite.apache.org/.
Aravind Narayanan, Tupperware: Containerized Deployment at Facebook, In Dockercon, 2014.

(Continued)

*Primary Examiner* — Hung T Vy
(74) *Attorney, Agent, or Firm* — Van Pelt, Yi & James LLP

(57) ABSTRACT

Two streams of data items are received. A first estimated processing time for the first stream of data items and a second estimated processing time for the second stream of data items are determined. Data items of the first stream and data items of the second stream are dynamically maintained in a first buffer and a second buffer respectively. The data items of the second stream maintained in the second buffer have associated event times that are within a first join window based on the first estimated processing time for the first stream. A selected data item of the first stream maintained in the first buffer is joined with one or more data items of the second stream maintained in the second buffer that have associated event times that are within a second join window based on an event time associated with the selected data item of the first stream.

16 Claims, 8 Drawing Sheets

(56) References Cited

OTHER PUBLICATIONS

Armbrust et al., Structured Streaming: A Declarative API ForReal-Time Applications in Apache Spark, In SIGMOD, 2018.
Babu et al., Exploiting K-Constraints to Reduce Memory Overhead in Continuous Queries Over Data Streams, ACM Trans. Database Syst., 29(3):545-580, Sep. 2004.
Carbone et al., State Management in Apache Flink: Consistent Stateful Distributed Stream Processing, Proc. VLDB Endow., 10(12):1718-1729, Aug. 2017.
Chen et al., Realtime Data Processing at Facebook. SIGMOD, 2016.
Das et al., Approximate Join Processing Over Data Streams, SIGMOD, 2003.
Das et al., Introducing Stream-Stream Joins in Apache Spark 2.3. https://databricks.com/blog/2018/03/13/introducing-stream-stream-joins-in-apache-spark-2-3. html, Mar. 13, 2018.
Dean et al., Mapreduce: Simplified Data Processing on Large Clusters, In OSDI, 2004.
Ding et al., Evaluating Window Joins Over Punctuated Streams, CIKM, 2004.
Gedik et al., Adaptive Load Shedding for Windowed Stream Joins, CIKM, 2005.
Gedik et al., Executing Stream Joins on the Cell Processor, VLDB, 2007.
Goetz Graefe, Volcano—An Extensible and Parallel Query Evaluation System, IEEE Trans. on Knowl. and Data Eng., 6(1):120-135, Feb. 1994.
Hirzel et al., IBM Streams Processing Language: Analyzing Big Data in Motion IBM Journal of Research and Development, 57(3/4):7, 2013.
Jacques-Silva et al., Consistent Regions: Guaranteed Tuple Processing in IBM Streams, Proc. VLDB Endow., 9(13):1341-1352, Sep. 2016.
Kang et al., Evaluating Window Joins Over Unbounded Streams. In ICDE, 2003.
Karnagel et al., The HELLS-Join: A Heterogeneous Stream Join for Extremely Large Windows, Damon, 2013.
Larson et al., Efficient Maintenance of Materialized Outer-Join Views. In ICDE, pp. 56-65, Apr. 2007.
Lin et al., Scalable Distributed Stream Join Processing, SIGMOD, 2015.
Mai et al., Introducing AthenaX, Uber Engineerings Open Source Streaming Analytics Platform, https://eng.uber.com/athenax/, Oct. 9, 2017, retrieved from: https://web.archive.org/web/20171025101442/https://eng.uber.com/athenax/.
Noghabi et al., Samza: Stateful Scalable Stream Processing at Linkedin, Proc. VLDB Endow., 10(12):1634-1645, Aug. 2017.
Presto, https://prestodb.io/, Jun. 18, 2018, retrieved from: https://web.archive.org/web/20180618115705/https://prestodb.io/.
Rocksdb, https://github.com/facebook/rocksdb/ Jun. 10, 2018, retrieved from: https://web.archive.org/web/20180610233541/https://github.com/facebook/rocksdb.
Tang et al., Holistic Configuration Management at Facebook, In SOSP, 2015.
Teubner et al., How Soccer Players Would Do Stream Joins, SIGMOD, 2011.
Thusoo et al., Hive—A Petabyte Scale Data Warehouse Using Hadoop, In ICDE, 2010.
Venkataraman et al., Drizzle: Fast and Adaptable Stream Processing at Scale, In SOSP, 2017.
Wilschut et al., Dataflow Query Execution in a Parallel Main-Memory Environment, In PDIS, 1991.
Wu et al., Window-Oblivious Join: A Data-Driven Memory Management Scheme for Stream Join, In SSDBM, 2007.
Zstandard, http://facebook.github.io/zstd/, Jun. 18, 2018, retrieved from: https://web.archive.org/web/20180618174444/http://facebook.github.io/zstd/.

\* cited by examiner

300

```
00: CREATE APPLICATION sample_app;
01:
02: CREATE INPUT TABLE left (
03:   eventtime, key, dim_one, metric
04: ) FROM SCRIBE("left");
05:
06: CREATE INPUT TABLE right (
07:    eventtime, key, dim_two, dim_three
08: ) FROM SCRIBE("right");
09:
10: CREATE VIEW joined_streams AS
11:   SELECT
12:     l.eventtime AS eventtime, l.key AS key,
13:     l.dim_one AS dim_one, r.dim_two AS dim_two,
14:     COALESCE(r.dim_three, "example") AS dim_three,
15:     ABS(l.metric) AS metric
16:   FROM left AS l
17:   LEFT OUTER JOIN right AS r
18:     ON (l.key = r.key) AND
19:        (r.eventtime BETWEEN
20:           l.eventtime - INTERVAL '3 minutes' AND
21:           l.eventtime + INTERVAL '3 minutes');
22:
23: CREATE TABLE result AS
24:   SELECT
25:     eventtime, key, dim_one, dim_two,
26:     dim_three, metric
27:   FROM joined_streams
28:   STORAGE SCRIBE (category = "result");
```

*Fig. 3*

| Batch size | Estimated processing time | | | | | | | | | | | | | | Ascending |
|---|---|---|---|---|---|---|---|---|---|---|---|---|---|---|---|
| w | 2 | 3 | 1 | 2 | 4 | 1 | 3 | 5 | 3 | 4 | 7 | 5 | 6 | 4 | 8 | 7 | ✗ |
| 2w | 2.5 | | 1.5 | | 2.5 | | 4 | | 3.5 | | 6 | | 5 | | 7.5 | ✗ |
| 4w | 2 | | | | 3.25 | | | | 4.75 | | | | 6.25 | | | ✓ |

Now →

Fig. 8

STREAMING JOINS WITH SYNCHRONIZATION VIA STREAM TIME ESTIMATIONS

BACKGROUND OF THE INVENTION

Stream processing applications reduce the latency of batch data pipelines and enable engineers to quickly identify production issues. Typically, a service can log data to distinct streams, even if they relate to the same real-world event (e.g., a search on Facebook's search bar). Furthermore, the logging of related events can appear on the server side with different delays, causing one stream to be significantly behind the other in terms of logged event times for a given log entry. The system needs to be able to join two different streams, each having data that is out-of-order to different degrees. Joining two such streams (especially with significant data volumes) with a join operator is challenging because it consumes a large amount of memory.

BRIEF DESCRIPTION OF THE DRAWINGS

Various embodiments of the invention are disclosed in the following detailed description and the accompanying drawings.

FIG. 3 shows a PQL query 300 with a view containing a streaming join clause.

FIG. 8 illustrates a table 800 showing that the micro-batch size may be adjusted to determine an ascending PT sequence.

DETAILED DESCRIPTION

Figure 1:
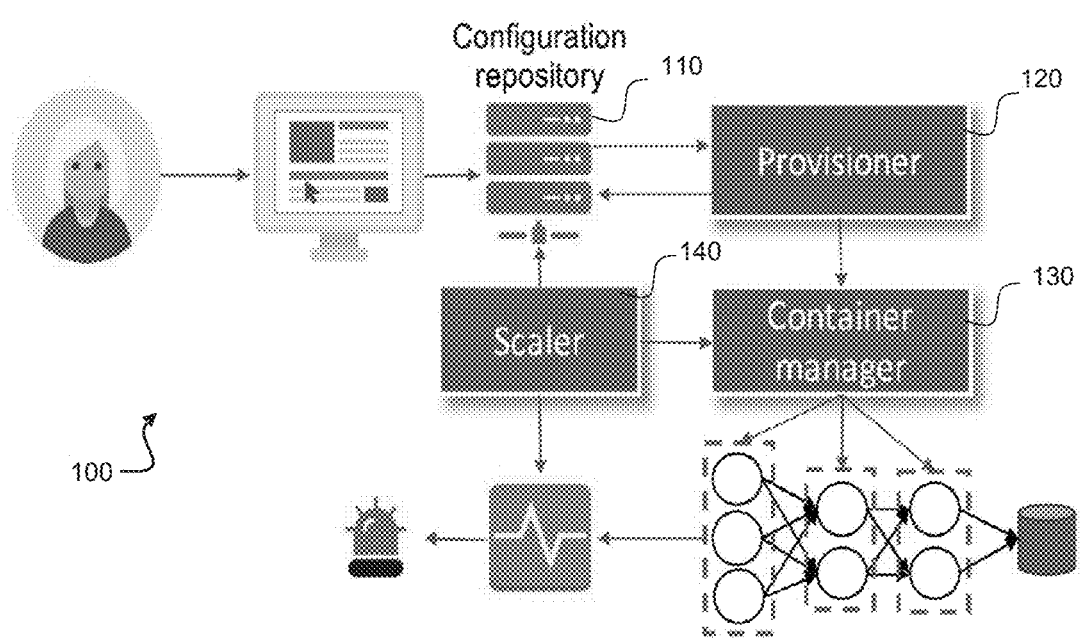
FIG. 1 shows one example of a work flow 100 in an example stream processing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data analysis pipelines may be expressed in SQL (Structured Query Language). SQL enables developers to bootstrap new analytics jobs quickly. SQL queries may be executed in either batch mode or in streaming mode. When running a query in batch mode, data must first be fully available for processing. One way to do so is to first ingest the data into a table on a data warehouse. Once a new partition of a table lands (either daily or hourly), queries that depend on the new partition can be started. In contrast, when a query runs in a streaming fashion, data is continuously processed as it is acquired, and the output is generated as soon as all the input data required for its computation is available. The generated results can then be immediately consumed by other downstream applications or ingested into a data warehouse for other uses.

A common operation used in many analytic workloads is the joining of different data sources. Joining the different data sources only after the data is fully available (e.g., in a data warehouse) incurs high-latency, which causes several problems for users. One such problem is the delay of computing derived data sets, as the computation of a join can only start when both input data sets are fully available. Another disadvantage is that the results of joins cannot be used to power real-time metrics that are used for detecting and solving production issues.

In the present application, an end-to-end streaming join operator is disclosed. The streaming join operator uses an adaptive stream synchronization technique that is able to handle the different distributions of event times in real-world streams. This synchronization technique paces the parsing of new data and reduces overall operator memory footprint while providing high accuracy in synchronization. In some embodiments, the join operator may be integrated into a streaming SQL system to reduce the latency of several batch pipelines.

A streaming join operator stitches together information from different sources. The operator focuses on joining tuples according to an equality predicate (i.e., keys) and a time proximity (i.e., time window). A tuple is a data item on a stream. The join operator handles the joining of streams in which their joinable events occur close in terms of event time but might be processed by the streaming application far apart in time (e.g., separated by minutes to hours). This may happen when tuples related to the same real-world event are logged into different streams with hours of delay. For example, in mobile applications, event logging may not be performed immediately if the device is connected via a cellular network only and may be delayed until a device reconnects to the network via Wi-Fi. The streaming join operator uses tuple event time, which is different from other time-based streaming join operators that use the time that the tuple gets processed to establish windows.

In some embodiments, the join operator may be integrated into a stream processing system, such as Puma—Facebook's SQL-based stream processing service—so that users can easily spawn new automatically managed applications that join matching tuples as they are processed. In some embodiments, event time-based joins balance output latency, join accuracy, and memory footprint. It also takes into consideration that streams have different characteristics regarding their event time distributions. It provides a best-effort streaming join that maximizes the join accuracy by pacing the consumption of the input streams based on the event time of incoming tuples.

To increase the accuracy of a best-effort join operator while maintaining service stability, some of the techniques include to: (i) estimate the stream time based on the observed tuple event times to consume each of the input streams, (ii) bound the number of tuples associated with a given key in order to limit the in-memory state of heavily skewed data, and (iii) leverage an intermediary persistent message bus to avoid check-pointing part of the in-memory state of the join operator.

In some embodiments, to enable users to easily deploy streaming applications using joins, the join operator is integrated into a streaming SQL language. One such example is PQL (Puma Query Language). Users create an application by specifying a join statement with an equality attribute and a window bound. The query language compiler can ensure that allowed application updates can be deployed in a backward compatible manner without loss of in-flight data. After deployment, the stream processing system can be responsible for automatically scaling the application when it needs more resources than its current reservation and setting up alarms to notify users and service maintainers when failures or SLA violations occur.

In the present application, a streaming join operator that leverages a stream synchronization scheme based on tuple event times is disclosed. The streaming join operator paces the parsing of new data and reduces memory consumption. This operator leverages the required processing semantics of certain applications to provide a more efficient fault tolerance scheme while still achieving a high join matching rate. The present application discloses a query planner that produces streaming join plans that support application updates, ensuring that users may modify their queries without causing the join operator to lose its internal state. The present application discloses a stream time estimation scheme that automatically handles the variations in the distribution of event times observed in real-world streams and that achieves high join accuracy. The streaming join operator paces tuple processing to reduce resource consumption and generates streaming SQL query plans with joins that support application updates.

In some embodiments, the streaming join service may be implemented in a stream processing platform, such as Facebook's stream processing platforms: Puma and Stylus. Both systems may ingest data from a persistent message bus, such as Facebook's Scribe, and may later publish data back to Scribe. Puma, Stylus, and Scribe are provided as illustrative examples only, and therefore should not be viewed as limiting. One of skilled in the art should realize that other stream processing platforms or other types of persistent message buses may be used as well.

Scribe is a persistent and distributed messaging system that allows any applications within Facebook to easily log events. New data written into Scribe may be read by a different process within a few seconds. When writing or reading data from Scribe, processes specify a category and a bucket. A category contains all the logs of a system that follow the same schema. A bucket allows the data to be sharded according to a criterion (e.g., an attribute value) and is equivalent to a shard or a partition. An application can achieve data parallelism by reading different buckets of the same category. Scribe may keep data available for a number of days.

Puma enables developers to write streaming applications written in PQL and easily deploy them to production. This is because Puma is offered as a service and automatically provides monitoring, alarming, fault-tolerance, and scaling.

FIG. 1 shows one example of a work flow 100 in an example stream processing system, Puma. Developers start by creating a Puma application in PQL via the Puma portal. Once testing and code review have been completed, the PQL query may be landed into a configuration repository 110. Landing is allowed if the query compiles and passes safety checks meant to ensure that the query will not fail in production or hurt the performance of other applications (e.g., by consuming too many resources).

The provisioner service 120 monitors any application landing and constructs and deploys the application's physical plan. It first creates a directed acyclic graph (DAG) of operators to execute the query. It then identifies if it needs to create new production jobs or update existing production jobs to run the operators in the DAG. For new jobs, it creates a job configuration and contacts Facebook's container manager 130 to start it up. For existing jobs, it updates the job configuration with the new application information (e.g., version number and resource requirements) and issues an update to the container manager 130. The container manager 130 is responsible for monitoring the liveness of jobs, propagating configuration updates upon a job restart, and assigning jobs to hosts according to the requested resources. The provisioner 120 also creates any required Scribe category to execute the application's physical plan, because all communication between the operators in a DAG happens through Scribe.

Once the application is running, runtime information (e.g., tuple processing rate and backlog), which is used for monitoring and ringing alarms, is reported. Depending on those runtime metrics, the scaler component 140 may decide to scale up and down the jobs that compose an application. Scaling may be performed based on the number of tasks per job or the memory allocation per job. The job configuration is updated and the container manager 130 is contacted to restart the updated job. If any of the current hosts can no longer accommodate the updated job's tasks with the new specified resource entitlement (e.g., a task needs 10 GB of memory, but only 5 GB is available), then the container manager 130 may move the job to a host with sufficient resources.

Puma enforces backward compatible application updates with respect to the internal state of stateful operators. When a user modifies an existing query, Puma ensures that the update can be performed without any loss of state. For example, when the query contains a statement for doing hourly window aggregations, a user might want to add more aggregations to that same statement (e.g., count, sum, and max). One simple way to carry out such an update is to drop any current aggregation value and restart the query. The disadvantage is that the applications would lose the collected information from any ongoing aggregations. Puma ensures that (i) the new statement may be deployed in a backward compatible manner, and (ii) aggregations will appear to continue to be computed from the point where the application update operation started.

Stylus is a C++ framework for building stream processing operators and provides a lower level of abstraction than Puma. Stylus provides generic and flexible APIs (Application Programming Interface) for implementing different kinds of operators, such as stateless, stateful, and monoid. The APIs and their specialized implementations for each kind of operator are also called a Stylus engine. A common use case for Stylus is to ingest tuples from a Scribe stream and output them to another Scribe stream or other data stores. Stylus is a C++ API and provides a large degree of flexibility for developers to implement various customized tuple transformations. Developers only need to focus on their business logic, while Stylus handles the common operations needed by most streaming operators, such as fault tolerance, sharding, and scaling data processing. Stylus allows an operator to read one or more buckets from a Scribe category. Stylus automatically splits the stream data into micro-batches and shards tuples into multiple threads for parallel processing.

Stylus also provides operators the ability to replay a Scribe stream for an earlier point in time and store any in-memory state to local and remote storage (e.g., a Hadoop Distributed File System, or HDFS). Given Stylus can both read and write to Scribe categories, operators can be easily plugged into a Puma-generated DAG. The join operator may be built on top of Stylus.

Two input streams (hereinafter referred to as the left and right streams) are joined using a window-based equality join. The join window is defined using a tuple attribute, which is the tuple's event time. Tuples from the left stream are joined with tuples in the right stream when the specified key attribute matches and when the event times of the tuples in the right stream fall within a join window, as will be described in greater detail below.

More specifically, an event time is the creation time of the tuple. The event time has a delay when compared to the wall clock time when the tuple is processed by the streaming application. This delay varies for different tuple sources, and tuples in the same stream are not usually ordered by their event times. Other techniques typically assign a timestamp to the tuple when the tuple is first being processed by the streaming application, and the assigned timestamp is used for joining the streams. In contrast, the present techniques use the tuple creation time for joining the streams.

The join window is an interval on the right stream calculated from the event time of a left stream tuple. Tuples from the left stream are joined only with tuples on the right stream that fall within the calculated interval. Although the window specification is the same for every tuple, each tuple has its own window, which can be overlapping with the windows of other tuples. The join key is the tuple attributes that are used to do the join equality check. A left stream tuple and a right stream tuple only join when their join keys are the same.

The join result is an inner join or a left outer join. The join result outputs a projection of the attributes from the left and the matching right tuples. In the left outer join case, the right event attributes are filled with null values for failed matches. The join output can be all matching tuples within a window (1-to-n) or a single tuple within a window (1-to-1). The latter is useful when a single match is sufficient and enables reduced output latency, as the operator does not have to wait for the whole join window to be available before emitting a match.

Figure 2:
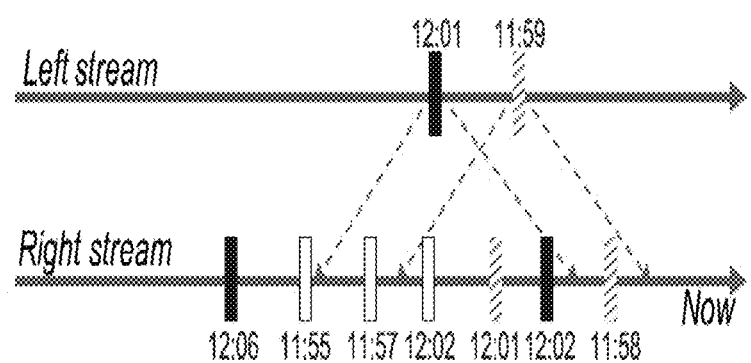
FIG. 2 shows an example of the join windows for two different events on the left stream for a window interval of [−3 minutes, +3 minutes].

FIG. 2 shows an example of the join windows for two different events (marked by a solid black bar and a shaded bar respectively) on the left stream for a window interval of [−3 minutes, +3 minutes]. A solid black bar or a shaded bar each represents a different join key, and a timestamp (e.g., 12:01 or 11:59) represents the tuple event time. Streams are not ordered by event time and the join window is computed based on the left tuple timestamp. Depending on the desired join output, the left tuple (marked by an event time of 11:59 and a shaded bar) could match one or both of the right tuples on the join window (marked by event times of 12:01 and 11:58 and shaded bars). A tuple in the left stream is joined with the right stream tuples that fall into the left stream tuple's join window, i.e., [left stream tuple's event time+lower boundary, left stream tuple's event time+upper boundary]. If there is no assumption regarding the time of a stream, a tuple would have to wait forever for a match, as it is always possible to process a new tuple with a timestamp that would belong to a valid window interval. Deciding when a tuple should be emitted as a non-match or that all matches in a 1-to-n scenario can be emitted is related to processing time estimation and stream synchronization, which will be described in greater detail below.

Puma's planner builds a DAG of operators for streaming join queries. Left outer joins match a tuple from the left stream with all tuples from the right stream that match the join condition within the specified time window (see FIG. 2).

Users may build a streaming application by writing a query in PQL. A query is a sequence of four kinds of statements: 1. create application—specifies a unique application name within Puma's namespace; 2. create input table—names an input stream and describes its schema (it indicates which Scribe category the data must be consumed from); 3. create view—specifies a stream transformation via expressions, user-defined functions, column projection, and tuple filtering (a view can specify joins between two streams); and 4. create table—describes additional transformations on the data from a view, including time-based aggregations. It also includes information about where to store the results of the table's transformations. Depending on the storage chosen, users can specify a sharding expression.

A PQL query has a single create application statement, but it may have an unbounded number of create input table, create view, and create table statements. A user can assemble a DAG by chaining the different statements mentioned above.

FIG. 3 shows a PQL query 300 with a view containing a streaming join clause. In this example, the left stream has four attributes and consumes data from a Scribe category named left (lines 02-04). Similarly, the right stream has four attributes and reads data from the right category (lines 06-08). Users do not need to specify types when declaring a schema. Puma does type inference depending on the expressions and functions that the attribute is used in. Users may use explicit casting when necessary. The join view specification indicates the left stream (line 16), the right stream (line 17), and the equality expression (line 18). The window itself is expressed with the BETWEEN function and uses intervals on the timestamp attributes (lines 19-21). This example shows an interval of six minutes. The lower and upper bounds may have different sizes and may be defined in hours or seconds. The timestamp attribute for each stream is inferred from the BETWEEN function called from the ON expression. The output of the application is published to a Scribe category named result (lines 23-28).

Given a PQL query, Puma compiles it and determines its execution plan. The planner itself has two main constraints: the first is to divide the work across operators according to their capabilities; and the second is to generate a plan that is backwards compatible with existing system data prior to the update, which includes state and in-transit data. The latter fulfills users' expectations regarding application updates. Even though an application is being restarted (e.g., adding a new filtering condition), Puma attempts to reduce the amount of data duplication and data loss for end users. Puma ensures that any in-memory state of stateful operators and in-transit data being used before an update are still readable after the update takes place. This is not enforced unless explicitly requested in the PQL query change, for example by removing existing views or output tables.

The Puma planner has two different operators: 1. Slicer—a Puma operator similar to a mapper in a MapReduce system. Slicers may ingest data from Scribe, evaluate expressions, perform tuple filtering, project columns, perform stream sharding according to an expression, and write data to Scribe and other storage sinks. 2. Join—a Stylus operator. The join operator ingests data from two Scribe streams, maintains the join windows, executes the join logic, and outputs the result tuples into another Scribe stream.

Figure 4:
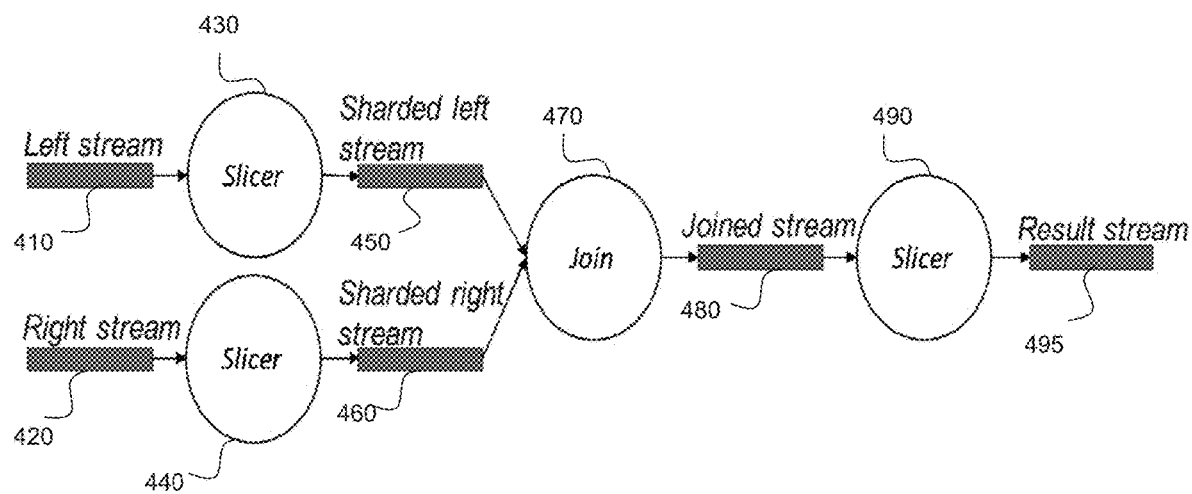
FIG. 4 shows a logical operator graph for a join query.

FIG. 4 shows a logical operator graph for a join query. As shown in FIG. 4, a streaming join query is planned as (i) a left slicer 430 that ingests the Scribe category (left stream 410) specified on the left side of the join and shards it according to the equality attribute, (ii) a right slicer 440 with the same functionality as the left slicer but consuming the right-side Scribe category (right stream 420) instead, (iii) a join operator 470 that consumes the output Scribe category of both the left and right slicers (sharded left stream 450 and sharded right stream 460) and generates an output Scribe stream 480, and (iv) a post-join slicer 490, which does any other required stream transformation and writes the result stream 495 into the specified output system (e.g., Scribe). FIG. 4 illustrates the logical plan of the query. During execution, there are several parallel instances of each operator, where each instance reads one or more buckets of the input Scribe category. The degree of parallelism of each operator depends on the input traffic of its input Scribe category. The degree of parallelism may be adjusted dynamically by the scaler component throughout the day and may be independent for each operator.

Planning a streaming join query as described in FIG. 3 is equivalent to rewriting it as a PQL query with the input table, view, and table statements expanded into multiple simpler statements. This is done by leveraging an extensible part of the Puma compiler and planner called the PQL transformer. With the transformer, a sequence of PQL rewritings may be done, which enables new features to be added without making significant changes to other parts of Puma.

For streaming joins, there are two rewritings. The first one eliminates the table aliasing specified in the streaming join view (lines 16-17 in FIG. 3). It generates a new PQL query in which any reference to an alias is replaced by a reference to the full input table name (e.g., 1. eventtime AS eventtime becomes left.eventtime AS eventtime). The second transformation generates a PQL query that explicitly translates into a sequence of two slicers, a join operator, and a third slicer. This is equivalent to four groups of create input table, create view, and create table statements: one for each input stream, one for joining the streams, and one for post-processing the join output stream. This ensures that each sequence is assigned to exactly one operator.

The objective of the left-side stream transformation is to generate an equivalent PQL segment that is able to precompute the join equality and timestamp expressions, project and/or compute expressions on top of any left-side attribute used by the streaming join view, and shard the output stream by the equality attribute. The input table for this segment remains the same as in the original PQL query, as it just indicates the schema of the original input stream. The view statement selects first the expressions computing the timestamp and equality referred to in the ON clause (FIG. 3 uses the raw values of eventtime and key only). It then projects any attributes, constants, or expressions that refer exclusively to attributes of the left stream. Because this is a left outer join, it is safe to evaluate expressions before performing the join. Finally, the output table statement selects all attributes from the view and writes them to a new intermediary Scribe category sharded by the equality attribute.

The right-side stream transformation is similar to the left-side stream, with one key difference: expressions involving attributes from the right-side stream are not evaluated until after the join operator. This is because the outcome of the join may influence the result of the expression.

Another transformation is the join view transformation. Given that the expressions from the original join view are evaluated by the pre or post-join slicers, the transformed join view only refers to the results of evaluating the right and left-side stream transformations, available in the Scribe categories they write to. The join operator writes its results to another Scribe category.

Another transformation is the post join transformation. The objective of this operator is to evaluate expressions involving attributes from the right-side stream, and execute any other expressions specified in the original CREATE TABLE statement. The transformed CREATE TABLE statement also includes the specification of the storage to publish to/from the original statement.

The generated plan is made backward compatible such that application updates do not cause significant data duplication or data loss. When assembling DAGs, such as the one in streaming joins, Puma uses Scribe categories as the communication substrate between stages. This enables operators to be less coupled and thus simplifies fault-tolerance, scalability, debugging, monitoring, and alerting. After an update, data from the previous version of an application may exist on the message bus, waiting to be processed. As a result, to enable backward compatible updates, the planner creates an execution plan that extends both the wire format and the state preserved by stateful operators in a compatible way (e.g., new columns are appended to the end stream schema). The wire format is enforced on the input and output categories of the join, and the state format is enforced for the join operator itself. The internal states of the join operator are preserved. In the event of a streaming application update, new internal states of the join operator may be determined based at least in part on the preserved internal states of the join operator prior to the streaming application update.

To make the plan backward compatible, the changes that the user may perform in the streaming join view are limited, and some optimizations are not implemented. Two examples of rules an update may follow are (i) preservation of the join equality expression, as its modification can cause resharding of the Scribe categories; and (ii) projection of new attributes must be specified at the end of the select list, as adding an attribute in the middle of the select list would cause the join operator to consume old attribute values as the values of a different attribute—both for tuples in the wire and tuples preserved as join operator state. This is required because the schema of Scribe categories is based on order. One example of an optimization that is not implemented is the possibility of projecting constants only at the final stage of the DAG. The planner ends up projecting constant expressions specified at the streaming join view to be performed by the left-side slicer, thereby maintaining the wire format. This enables users to later change the specification of the constant expression. Another example of optimization that is not implemented is the automatic removal of projected attributes that are not used by the downstream operators. The reason is that automatically removing the projected attributes would cause a change in the wire format, which should be maintained for compatibility.

Update rules are enforced by the PQL compiler. A violation may be displayed to the developer coupled with alternatives for how to proceed with such an update. If the updated streaming join is significantly different, then users may be given the option of creating a view with a new name and deleting the old one. In such cases, the users are aware that any in-flight data may be discarded.

As shown in FIG. 4, the join operator 470 ingests the data computed by the left and right slicers (430 and 440) sharded according to the specified equality attribute. The join operator 470 processes data for both the left and right streams corresponding to the same key space (i.e., belonging to the same Scribe bucket). As a result, all the join matching decisions are performed locally within a single process.

Overall, join operator 470 continuously builds an in-memory hash table for the right stream, keeping all tuples belonging to the specified time window. Then, for every tuple on the left stream, the operator performs a lookup to find the events with the same key (i.e., hash join) and that fall into the join window as calculated from the tuple event time. Once matching tuples are identified, the operator calls a function that implements the different join scenarios, such as 1-to-1 join, or 1-to-n join.

In some embodiments, the operator may be implemented on top of Stylus, and it synchronizes the two input streams, so that it can achieve a high join matching rate while limiting memory consumption. In addition, by implementing the join operator on top of Stylus, all its built-in features, such as scalability, fault-tolerance, and parallelism may be inherited.

Figure 5:
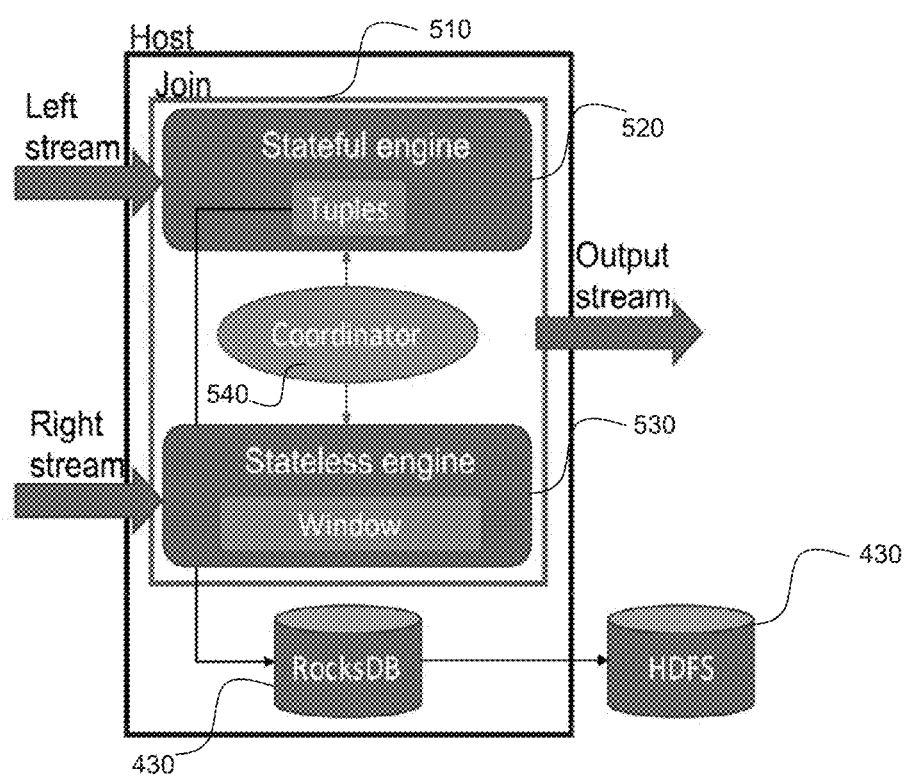
FIG. 5 shows an example of the overall structure of a join operator 510.

FIG. 5 shows an example of the overall structure of a join operator 510. It comprises three components: (i) a stateful engine 520 to process the left stream, (ii) a stateless engine 530 to process the right stream, and (iii) a coordinator 540, to bridge the two engines together.

The left stateful engine 520 processes the left stream and stores the incoming tuples in a memory buffer. The buffer is encapsulated into Stylus states, which are used by the framework to automatically do incremental state checkpointing. States may be periodically persisted into a local RocksDB (an embedded database for key-value data) instance and replicated asynchronously to remote distributed file system clusters (e.g., HDFS) in order to tolerate host and datacenter failures. When a tuple in the left stream is processed, the operator looks for matching tuples on the right join window. When a lookup succeeds, it calls a function to generate the join result. If there are no matches, the tuple is retained in the buffer to retry later. Once a match succeeds or permanently fails (i.e., the window has closed and there is no match), the tuple may be emitted as a non-match (in the case of a left outer join) and gets evicted from the buffer. Note that input tuple order is not preserved on the output stream. Preserving the input tuple order is not a requirement such that the buffer may be trimmed more aggressively.

The right stateless engine 530 ingests the right stream and maintains a window of tuples on the right stream that matches the specified join window for the incoming left stream tuples. The engine stores incoming tuples in an in-memory hash map on the joining attribute. The engine provides a lookup API to retrieve all matching events. The window is periodically trimmed when existing tuples fall out of the join window. This happens when the estimated stream processing time moves forward. Note that even though the engine maintains an in-memory state, the engine is stateless with respect to the Stylus framework. This is because the join window does not have to be check-pointed to a local or remote storage. Here, it is known that (i) certain applications do not need exactly-once processing semantics, and (ii) that a persistent message bus (Scribe) is used for inter-operator communication. As a result, data may be replayed to re-populate the window upon an operator being restarted. This significantly simplifies the implementation and the maintenance of the service, as the overhead of data backup is avoided. Even though the window may have several hours of data, it might only take a couple of minutes to recover a full window, depending on the throughput of the used persistent message bus.

The join coordinator 540 brings both engines together by providing APIs for the left engine to look up matching tuples in the right engine, and for both engines to query each other's stream time estimates. The latter is used for stream synchronization. The APIs effectively hide the implementation of the two engines from each other, decoupling the designs of the two engines.

The startup of a join operator occurs as follows: (i) the left engine 510 reads the last saved checkpoint from either a local or remote storage and reconstructs its state; (ii) the coordinator 540 pauses the left engine; (iii) the right engine 530 is initialized and replays data from Scribe; and iv) after the right engine's current stream time is fully caught up to the left engine's, the coordinator 540 resumes the left engine 510.

Pacing input of tuples for the join operator may be seen as similar to the pull-based engines that request the next tuple from its upstream on demand. The join operator reads data that is already materialized in Scribe and does so by considering the estimated stream processing time.

Some other streaming join techniques assume that tuples from two separate streams with similar event times will arrive in the system close in time. These techniques assign a timestamp to a tuple when the tuple is first ingested by the source operators of a streaming application. However, tuples with similar event times in two different streams may arrive at significantly different times. One of the causes is that the way that logging works in different platforms may be different, thereby causing significantly different arrival times. For example, data from mobile clients may be uploaded to the server side a number of hours after an event had occurred. Another cause is the processing delays in upstream systems. For example, systems that do sessionization emit events several minutes after ingestion (e.g., 30 minutes). Furthermore, failures in upstream systems can be a source of processing delay.

One simple solution to cover late data is to use a large join window. There are, however, many drawbacks to this approach. First, it leads to inefficient memory utilization, as the operator may end up buffering data that is not used for current matches. Second, using a fixed length join window may fail when the amount of delay in the streams changes over time. This is common especially when upstream systems have a backlog.

In the present application, the join semantics are based on the tuples' event times. In addition, the ingestion of the left and right streams is aligned based on the event times of their tuples. The join operator synchronizes the input streams ingestion based on a dynamically estimated processing time of the left stream and a dynamically estimated processing time of the right stream. In this way, tuples that are in memory overlap in terms of their event times, thereby increasing the chance of tuple matches.

Figure 6:
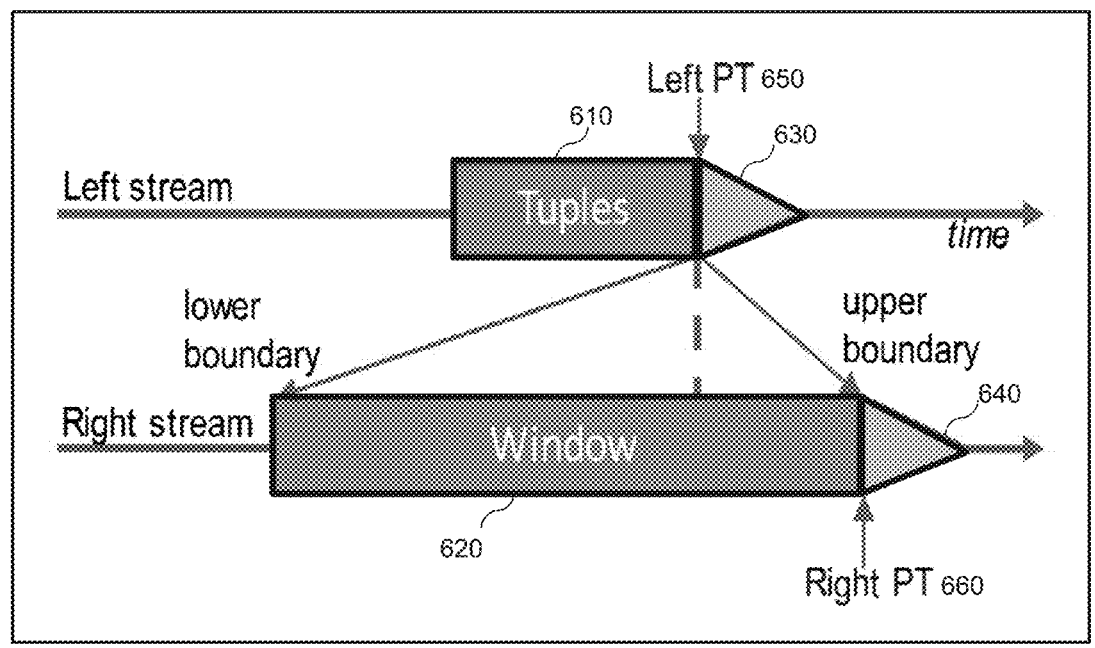
FIG. 6 shows that synchronizing the input stream ingestion based on the dynamically estimated processing times of the left stream and the right stream increases the chance of tuple matches.

FIG. 6 shows the buffers maintained by the join operator based on the stream processing time estimations. FIG. 6 shows that synchronizing the input stream ingestion based on the dynamically estimated processing times of the left stream and the right stream increases the chance of tuple matches. The estimated stream processing time (also referred to as PT) is a low watermark of the event times that have been processed in one stream, i.e., there is a high probability that a new incoming tuple will have an event time greater than the currently estimated PT. The join operator executes the stream synchronization by pausing the stream that has its PT too far ahead of the other. When the stream is being paused, the tuples are not being ingested and processed. As shown in FIG. 6, the synchronization maintains the relationship: left PT+window upper boundary=right PT, where the left PT is the processing time estimated for the left stream, and the right PT is the processing time for the right stream, and the window upper boundary is the upper boundary of the join window. The window upper boundary is an offset value that is measured from the left PT.

The join window is specified as $[t_1, t_2]$, wherein $t_1$, $t_2$ are two predetermined configurable periods of time, and wherein $t_2$ is greater than $t_1$. The upper boundary of the join window is $t_2$ minutes, and the lower boundary of the join window is $t_1$ minutes. The join window length is $t_2$-$t_1$. $t_2$ and $t_1$ may have positive values or negative values, with $t_2$ greater than $t_1$. In some embodiments, $t_2$ is a positive number and $t_1$ is a negative number. For example, if the window is specified as [−60 minutes, +5 minutes], then the upper boundary is +5 minutes, the lower boundary is −60 mins, and the window length is 65 minutes. In some embodiments, $t_2$ is a negative number and $t_1$ is a negative number. For example, if the window is specified as [−60 minutes, −5 minutes], then the upper boundary is −5 minutes, the lower boundary is −60 mins, and the window length is 55 minutes.

Referring to FIG. 6, box 610 illustrates tuples that are currently maintained from the left stream. Box 620 illustrates tuples that are currently maintained from the right stream. The tuples in box 610 have event times that are smaller than the currently estimated left PT 650 of the left stream, and the tuples in box 620 have event times that are smaller than the currently estimated right PT 660 of the right stream. Triangle 630 represents the newly processed tuples in the left stream that have event times that are greater than the current left PT 650 of the left stream. Triangle 640 represents the newly processed tuples in the right stream that have event times that are greater than the current right PT 660 of the right stream.

To give the tuples a higher chance of a match, a full window of tuples of the right stream around the estimated left PT 650 is maintained in a buffer. The buffer contains right stream tuples with event times that fall into the left stream PT's join window, i.e., [left PT+lower boundary, left PT+upper boundary]. The window provides nearly all tuples in the expected range to match with tuples on the left stream. Note that the PT is an estimated low watermark time such that it is very unlikely that the later incoming tuples will have event times that are lower than the PT. As a result, when the PT increases in time, it is safe to discard the tuples from the lower boundary of the window, as it is unlikely that those tuples will match with the newer tuples from the left stream.

Suppose that the estimated PT is calculated based on p, where p is measured as a percentile of the event time distribution. For example, if the processing time is set to be the 1% lower watermark, then p is equal to 1. The same p value is used for both the left and right streams. For a limited period of time, it is estimated that the buffer maintained in the right stream covers (100−p) % of the tuples with an event time that is within the left PT's join window and also smaller than the right PT (i.e., tuples in box 620 in FIG. 6). As a result—assuming that the PT estimation is perfect—a lookup operation using the left PT would miss at most p % of the tuples from the right stream buffer. To calculate the join success rate, there are two cases that could happen when a new tuple comes in the left stream.

The new left tuple's event time may be smaller than the current left PT. Based on the PT definition, this case may occur with a probability of p % and it can have up to a 100% chance to miss matches from the right stream's buffer. The maximum join failure percentage for this case is p %*100%.

The new left tuple's event time may be equal to or greater than the current left PT. The probability of this case is (100−p) %. Joins can happen until the left PT becomes bigger than this tuple's event time, and the join failure possibility for tuples with an event time equal to the left PT is p %. As a result, it has at most p % chance to miss matches. The maximum join failure percentage for this case is (100−p) %*p %.

The minimum join success percentage can be described as 100% minus the maximum failure percentages above:

min join success percentage=100%−p %*100%−(100−p)*p %.

When p is equal to 1, the minimum join success rate is approximately 98%. In practice, the PT estimation is not perfect. It has been shown that matching rates that are very close to the ideal case may be achieved.

The join operator synchronizes both streams by pacing the ingestion of new data based on the PT estimates so as to maintain the buffers according to the constraint described above. The operator pauses the ingestion of data from the right stream when the difference between the right PT and the left PT is bigger than the upper window boundary. For example, if the join window is [−60 mins, +5 minutes], then if the right PT−the left PT>5 minutes, then the join operator pauses the ingestion of data from the right stream. This means that if the operator ingests more data, it will end up evicting tuples that could still be matched with new left stream events. The operator pauses the ingestion of data from the left stream when the left PT plus the window upper boundary is ahead of or greater than the right PT. This ensures that the operator is not buffering tuples unnecessarily and increasing memory consumption, as these would be tuples that will likely have to be retried to join later.

In some embodiments, the synchronization of the left and right streams is made when processing new data and, as a result, the left and right streams are not strictly aligned. As a result, some extra minutes of data for the right stream window are buffered. This is in addition to the window size buffer. The extra buffer avoids frequent stream pauses and reduces join failure rates.

The processing time (PT) indicates the estimated time of a stream, i.e., a time for which it is estimated that there will be no new tuples whose event time attributes have a value that is smaller than the processing time. The estimated processing time (PT) is an estimated time such that there is a high probability that a new incoming tuple will have an event time greater than the currently estimated PT.

In some embodiments, e.g., in Stylus, the processing time is implemented as a percentile of the processed event times. As tuples are not ordered by their event times in a stream and only event times that have been observed so far may be used, the PT is calculated based on a statistic on top of the processed event time distribution (e.g., a percentile or an average). To do so, the Stylus engine splits a stream's events into micro-batches with a configurable size (e.g., 2 seconds or every 1000 events). It then uses the chosen statistic to calculate the PT for the batch. In other words, it makes a histogram of the raw event times for each batch. For an x percentile statistic, it then assumes that any future micro-batch will have at most x % of events with an event time that is smaller than the PT.

The assumption above is based on the observation that the event times of tuples in a stream tend to increase over time. As a result, as long as a statistic that reflects that trend is used, the PT should also increase. The problem though is to determine the granularity (i.e., the micro-batch size) over which to make PT calculations, so that the PT can continuously increase. If the events are observed over a small micro-batch window, their event times are likely to appear very disordered. However, if the events are observed over a larger micro-batch window, then the new events will tend to have event times that are more recent than previously processed tuples. The ideal size of the micro-batch size is stream dependent, as the distribution of event times depends on how the logging happens. Event time distributions can differ greatly between streams containing server-side events and streams containing client side events.

It is expected that if a very large micro-batch size is used, then more events can be observed, and therefore the confidence level of the PT estimation increases. However, having a large micro-batch size leads to increased latency, because the wait for computing subsequent PTs is longer. Furthermore, the PT itself will tend to progress slower, as the statistic will consider a larger number of older tuples. As a result, the PT calculation should balance accuracy and latency. The accuracy is how well the PT estimation can fulfill the low watermark assumption that at most x % of events processed after a given PT will have an event time smaller than it. The latency is the delta between the PT estimate and the wall-clock time, which, in the case of the join operator, manifests as the tuple output delay. If a higher accuracy is preferred, the window of observation increases, resulting in a higher latency.

In some embodiments, the PT calculation determines the minimum micro-batch size that still generates increasing PTs. The micro-batch size indirectly represents how out-of-order a stream is. If the stream is somewhat ordered, ascending PTs may be generated with a smaller micro-batch size. If the stream has data that is very disordered, then a larger micro-batch size is required to generate ascending PTs.

Figure 7:
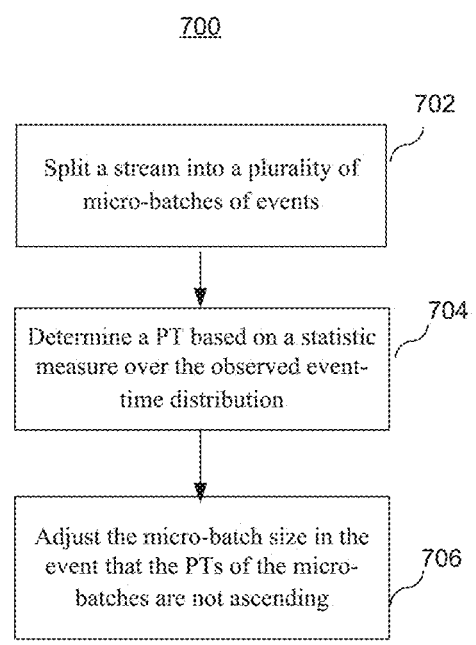
FIG. 7 illustrates a process for calculating the PT of a stream.

FIG. 7 illustrates a process 700 for calculating the PT of a stream. At 702, the stream is split into a plurality of micro-batches of events. For example, each micro-batch may include the tuples with event times that span over a predetermined time period, such as two minutes. In some embodiments, the division of the stream into micro-batches of events may be performed by Stylus, which was already designed to process data from Scribe in micro-batches.

At 704, for each micro-batch, a PT of the micro-batch is calculated based on a statistic measure (e.g., a percentile) over the observed event-time distribution. The PT of a stream is a time for which it is estimated that there will be no new tuples whose event time attributes have a value that is before the processing time. The PT is determined such that there is a high probability that a new incoming tuple will have an event time greater than the currently estimated PT. For example, for an x percentile statistic, the PT is determined such that within the micro-batch, at most x % of the tuples have an event time that is smaller than PT. The PT value calculated for each micro-batch may be used to find the ascending PT series.

At 706, if the PTs of the micro-batches are determined as not ascending, the adjacent windows are continuously merged such that an estimate for a larger micro-batch size is determined. The micro-batch size is adjusted to balance between accuracy and latency. In some embodiments, the micro-batch size is dynamically determined and adjusted. In some embodiments, the micro-batch size may be manually tuned for different use cases.

FIG. 8 illustrates a table 800 showing that the micro-batch size may be adjusted to determine an ascending PT sequence. Each cell in table 800 represents the PT value computed using a statistic over the event times of the tuples processed within a given micro-batch of the specified size (w, 2 w, or 4 w). For simplicity, the figure shows each PT as a small integer and uses an average as a statistic measure to estimate the PT. When looking at the PT value for a small micro-batch size (e.g., a micro-batch size of w), the estimated PT does not form an ascending PT sequence. For example, the underlined values are smaller than at least some previous values. As the micro-batch size increases (2 w), the trend of increasing PTs starts showing up, but an ascending sequence is still not formed. When the micro-batch size increases to 4 w, an ascending sequence is found. In this example, 4 w may be used as the micro-batch size for PT computation and the PT is set to be the result of the PT calculation over that micro-batch size (i.e., 6.25 in this case).

As shown in table 800, the micro-batch size is fixed for a PT calculation (e.g., 4 w) and its size is increased by fitting more eventtime values as more tuples are consumed. A maximum size is used to limit the memory growth of the operator.

The present application discloses a stream time estimation technique that automatically handles the variations on the distribution of event times observed in real-world streams and that achieves high join accuracy. In addition, a streaming join operator that leverages a stream synchronization technique based on tuple event times is disclosed. The streaming join operator paces the parsing of new data and reduces memory consumption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of joining two streams of data items by a join operator, comprising:
   receiving a first stream of data items by the join operator, wherein the join operator comprises a join operator integrated into a streaming Structured Query Language (SQL) system;
   splitting the first stream of data items by the join operator into a plurality of micro-batches of data items;
   receiving a second stream of data items by the join operator;

determining by the join operator a first estimated processing time for the first stream of data items, determining the first estimated processing time based at least in part on a statistical measure determined using event times associated with at least a portion of processed data items of the first stream, wherein event times associated with at least a portion of processed data items of the first stream comprises event times associated with one of the plurality of micro-batches of data items, comprising:
    determining the first estimated processing time such that within the one of the plurality of micro-batches of data items, at most a predetermined percentage of the event times have event times that are smaller than the first estimated processing time;
determining by the join operator a second estimated processing time for the second stream of data items, determining the second estimated processing time based at least in part on a statistical measure determined using event times associated with at least a portion of processed data items of the second stream;
dynamically maintaining by the join operator eligible data items of the first stream in a first buffer;
dynamically maintaining by the join operator eligible data items of the second stream in a second buffer, wherein the eligible data items of the second stream maintained in the second buffer have associated event times that are within a first join window based on the first estimated processing time for the first stream; and
joining by the join operator a selected data item of the first stream maintained in the first buffer with one or more data items of the second stream maintained in the second buffer and having associated event times that are within a second join window based on an event time associated with the selected data item of the first stream.

2. The method of claim 1, further comprising:
dynamically pausing processing of the data items of the first stream or the data items of the second stream to maintain a specified relationship between the first estimated processing time of the first stream and the second estimated processing time of the second stream.

3. The method of claim 1, wherein the first join window comprises a first join window lower boundary and a first join window upper boundary, and wherein the first join window lower boundary comprises a first offset threshold value that is measured from the first estimated processing time of the first stream, and wherein the first join window upper boundary comprises a second offset threshold value that is measured from the first estimated processing time of the first stream.

4. The method of claim 3, further comprising:
dynamically pausing processing of the data items of the first stream or the data items of the second stream to maintain a specified relationship of the first estimated processing time of the first stream, the second estimated processing time of the second stream, and the first join window upper boundary.

5. The method of claim 4, further comprising:
dynamically pausing processing of the data items of the first stream or the data items of the second stream such that the first estimated processing time of the first stream plus the first join window upper boundary is substantially equal to the second estimated processing time of the second stream.

6. The method of claim 1, further comprising:
preserving internal states of the join operator; and in the event of a streaming application update, determining new internal states of the join operator based at least in part on the preserved internal states of the join operator prior to the streaming application update, wherein the determination is made by a compiler, and wherein the compiler creates a streaming join plan such that the preserved internal states and the new internal states are compatible.

7. A system for joining two streams of data items, comprising:
a processor configured to:
    receive a first stream of data items by a join operator, wherein the join operator comprises a join operator integrated into a streaming Structured Query Language (SQL) system;
    split the first stream of data items by the join operator into a plurality of micro-batches of data items;
    receive a second stream of data items by the join operator;
    determine by the join operator a first estimated processing time for the first stream of data items, determine the first estimated processing time based at least in part on a statistical measure determined using event times associated with at least a portion of processed data items of the first stream, wherein event times associated with at least a portion of processed data items of the first stream comprises event times associated with one of the plurality of micro-batches of data items, comprising:
        determining the first estimated processing time such that within the one of the plurality of micro-batches of data items, at most a predetermined percentage of the event times have event times that are smaller than the first estimated processing time;
    determine by the join operator a second estimated processing time for the second stream of data items, determine the second estimated processing time based at least in part on a statistical measure determined using event times associated with at least a portion of processed data items of the second stream;
    dynamically maintain by the join operator eligible data items of the first stream in a first buffer;
    dynamically maintain by the join operator eligible data items of the second stream in a second buffer, wherein the eligible data items of the second stream maintained in the second buffer have associated event times that are within a first join window based on the first estimated processing time for the first stream; and
    join by the join operator a selected data item of the first stream maintained in the first buffer with one or more data items of the second stream maintained in the second buffer and having associated event times that are within a second join window based on an event time associated with the selected data item of the first stream; and
a memory coupled to the processor and configured to provide the processor with instructions.

8. The system of claim 7, wherein the processor is further configured to:
adjust a size of the plurality of micro-batches of data items such that the first estimated processing times associated with the plurality of micro-batches of data items are increasing.

9. The system of claim 7, wherein the processor is further configured to:

dynamically pause processing of the data items of the first stream or the data items of the second stream to maintain a specified relationship between the first estimated processing time of the first stream and the second estimated processing time of the second stream.

10. The system of claim 7, wherein the first join window comprises a first join window lower boundary and a first join window upper boundary, and wherein the first join window lower boundary comprises a first offset threshold value that is measured from the first estimated processing time of the first stream, and wherein the first join window upper boundary comprises a second offset threshold value that is measured from the first estimated processing time of the first stream.

11. The system of claim 10, wherein the processor is further configured to:
dynamically pause processing of the data items of the first stream or the data items of the second stream to maintain a specified relationship of the first estimated processing time of the first stream, the second estimated processing time of the second stream, and the first join window upper boundary.

12. The system of claim 11, wherein the processor is further configured to:
dynamically pause processing of the data items of the first stream or the data items of the second stream such that the first estimated processing time of the first stream plus the first join window upper boundary is substantially equal to the second estimated processing time of the second stream.

13. The system of claim 7, wherein the processor is further configured to:
preserve internal states of a join operator; and
in the event of a streaming application update, determine new internal states of the join operator based at least in part on the preserved internal states of the join operator prior to the streaming application update.

14. A computer program product for joining two streams of data items, the computer program product being embodied in a tangible computer readable storage medium and comprising computer instructions for:
receiving a first stream of data items by a join operator, wherein the join operator comprises a join operator integrated into a streaming Structured Query Language (SQL) system;
splitting the first stream of data items by the join operator into a plurality of micro-batches of data items;
receiving a second stream of data items by the join operator;
determining by the join operator a first estimated processing time for the first stream of data items, determining the first estimated processing time based at least in part on a statistical measure determined using event times associated with at least a portion of processed data items of the first stream, wherein event times associated with at least a portion of processed data items of the first stream comprises event times associated with one of the plurality of micro-batches of data items, comprising:
determining the first estimated processing time such that within the one of the plurality of micro-batches of data items, at most a predetermined percentage of the event times have event times that are smaller than the first estimated processing time;
determining by the join operator a second estimated processing time for the second stream of data items, determining the second estimated processing time based at least in part on a statistical measure determined using event times associated with at least a portion of processed data items of the second stream;
dynamically maintaining by the join operator eligible data items of the first stream in a first buffer;
dynamically maintaining by the join operator eligible data items of the second stream in a second buffer, wherein the eligible data items of the second stream maintained in the second buffer have associated event times that are within a first join window based on the first estimated processing time for the first stream; and
joining by the join operator a selected data item of the first stream maintained in the first buffer with one or more data items of the second stream maintained in the second buffer and having associated event times that are within a second join window based on an event time associated with the selected data item of the first stream.

15. A method of joining two streams of data items by a join operator, comprising:
receiving a first stream of data items by the join operator, wherein the join operator comprises a join operator integrated into a streaming Structured Query Language (SQL) system;
splitting the first stream of data items by the join operator into a plurality of micro-batches of data items;
receiving a second stream of data items by the join operator;
determining by the join operator a first estimated processing time for the first stream of data items, determining the first estimated processing time based at least in part on a statistical measure determined using event times associated with at least a portion of processed data items of the first stream, wherein event times associated with at least a portion of processed data items of the first stream comprises event times associated with one of the plurality of micro-batches of data items;
adjusting a size of the plurality of micro-batches of data items such that the first estimated processing times associated with the plurality of micro-batches of data items are increasing;
determining by the join operator a second estimated processing time for the second stream of data items, determining the second estimated processing time based at least in part on a statistical measure determined using event times associated with at least a portion of processed data items of the second stream;
dynamically maintaining by the join operator eligible data items of the first stream in a first buffer;
dynamically maintaining by the join operator eligible data items of the second stream in a second buffer, wherein the eligible data items of the second stream maintained in the second buffer have associated event times that are within a first join window based on the first estimated processing time for the first stream; and
joining by the join operator a selected data item of the first stream maintained in the first buffer with one or more data items of the second stream maintained in the second buffer and having associated event times that are within a second join window based on an event time associated with the selected data item of the first stream.

16. A system for joining two streams of data items, comprising:
a processor configured to:

receive a first stream of data items by a join operator, wherein the join operator comprises a join operator integrated into a streaming Structured Query Language (SQL) system;

split the first stream of data items by the join operator into a plurality of micro-batches of data items;

receive a second stream of data items by the join operator;

determine by the join operator a first estimated processing time for the first stream of data items, determine the first estimated processing time based at least in part on a statistical measure determined using event times associated with at least a portion of processed data items of the first stream, wherein event times associated with at least a portion of processed data items of the first stream comprises event times associated with one of the plurality of micro-batches of data items;

adjust a size of the plurality of micro-batches of data items such that the first estimated processing times associated with the plurality of micro-batches of data items are increasing;

determine by the join operator a second estimated processing time for the second stream of data items, determine the second estimated processing time based at least in part on a statistical measure determined using event times associated with at least a portion of processed data items of the second stream;

dynamically maintain by the join operator eligible data items of the first stream in a first buffer;

dynamically maintain by the join operator eligible data items of the second stream in a second buffer, wherein the eligible data items of the second stream maintained in the second buffer have associated event times that are within a first join window based on the first estimated processing time for the first stream; and join by the join operator a selected data item of the first stream maintained in the first buffer with one or more data items of the second stream maintained in the second buffer and having associated event times that are within a second join window based on an event time associated with the selected data item of the first stream; and a memory coupled to the processor and configured to provide the processor with instructions.

* * * * *